United States Patent Office 2,759,310
Patented Aug. 21, 1956

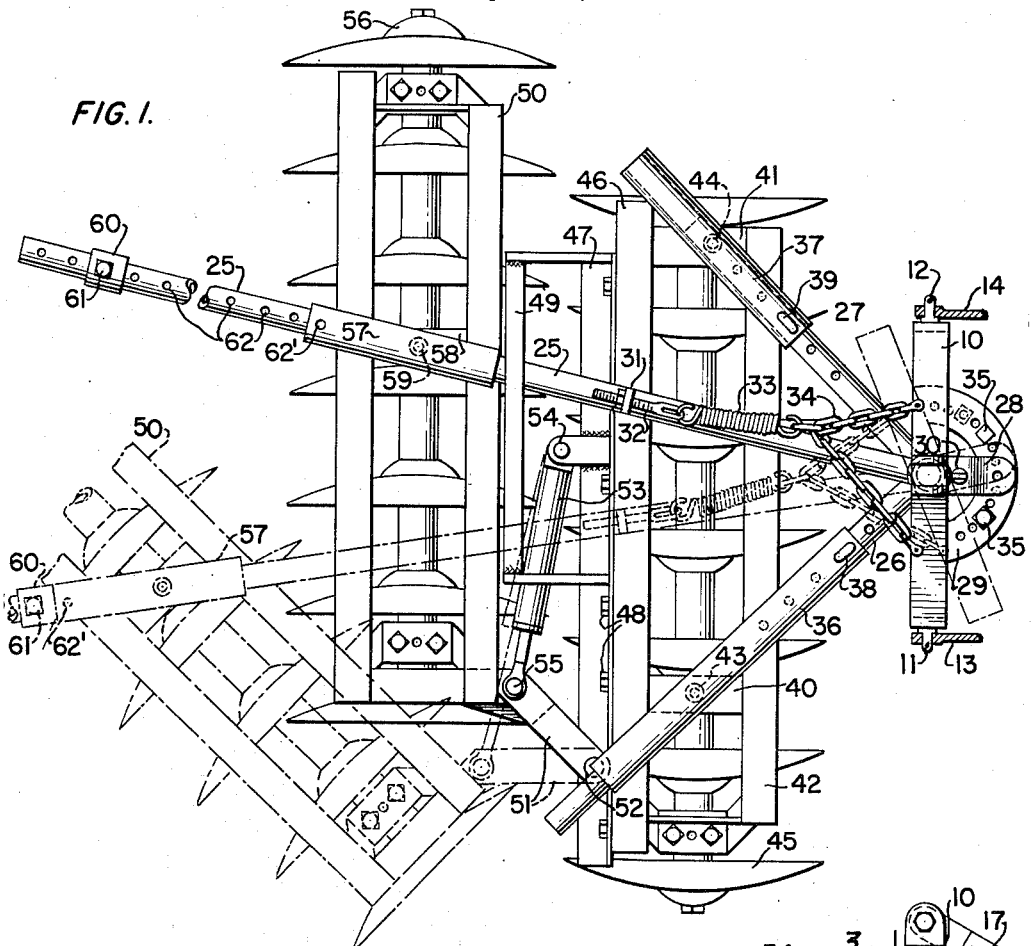

2,759,310

AGRICULTURAL TOOL FOR TRACTORS

Clarence E. Newkirk, Anaheim, Calif.

Application April 27, 1953, Serial No. 351,207

5 Claims. (Cl. 55—81)

This invention relates to implements for tractors having elevating hitches, and more particularly to agricultural implements such as disc harrows, cultivators and other earth working tools.

In the use of lift type tools, for elevating tractor hitches, which are generally of the three-point connection arrangement, it is highly desirable to employ a variety of implements which may be used in various agricultural work and which will be readily maneuverable when in the ground or in elevated position during transit. In particular, many problems are encountered in the operation of a lift type tool when employing gang discs in connection therewith. In such lift type tools it is highly desirable that the tool may be left in the ground during the turning of the towing tractor on a short radius. Heretofore, lift type tools employing such implements have not been capable of desired maneuverability when in the ground and when elevated and have not been capable of all the various adjustments necessary to properly and efficiently operate disc harrows.

It is an object of this invention to provide a lift type tool, for tractors having elevating hitches, which is very maneuverable when either working in the ground or when elevated during transit.

Another object of this invention is to provide a lift type tool of this class which permits very close coupling of the tool with the tractor and yet is readily maneuverable about short turns without interference of the tool with the wheels or tracks of the tractor.

Another object of this invention is to provide a tool of this class which is very stable when transported in elevated position.

Another object of this invention is to provide a lift type tool having a hitch frame permitting the tractor to turn in either direction when the implement is in the ground and which also eliminates side draft and permits the tractor to pull the tool with a minimum effort.

Another object of this invention is to provide a lift type tool of this class having laterally adjustable offset hitches which permit use of the tool with various tractors regardless of wheel spacing, whereby the tool is readily adaptable for work under trees in orchards, groves or vineyards and other specialized operations.

Another object of this invention is to provide an over-center spring arrangement which stabilizes the tool in certain alignment with the tractor when elevated, whereby it is prevented from swinging about its pivotal connection with the tractor.

Another object of this invention is to provide a lift type tool of this class wherein pivoted frames permit the implements to be closed into close proximity with the hitch, whereby the weight of the tool is carried closed to the tractor when elevated and in transit.

Another object of this invention is to provide a lift type tool of this class adapted to operate a plurality of gang discs which may be arranged in axial parellelism for rolling along the ground or highway in a comparable manner to an ordinary pull type tool, whereby the loading of the tool on a trailer is greatly simplified.

Another object of this invention is to provide means for lateral alignment of the rear disc gang so that they will cut properly in various ground conditions and will efficiently fill the dead furrow.

A further object of this invention is to provide a tool of this class employing a plurality of disc gangs which are readily adjustable laterally in both directions permitting the same to do a variety of work.

Further and other objects of the present invention will be hereinafter set forth in the accompanying specification and claims and shown in the drawings, which show, by way of illustration, a preferred embodiment and the principle thereof and what I consider to be the best mode in which I have contemplated of applying that principle. Other embodiments of the invention employing the same or equivalent principle may be used and structural changes made as desired by those skilled in the art without departing from the present invention and within the spirit of the appended claims.

Referring now to the drawings by numerals and reference, wherein like numerals correspond to like parts;

Fig. 1 is a top or plan view of my agricultural tool for tractors having elevating hitches showing by dash lines varying positions of portions of the tool and illustrating elements broken away and in section to facilitate and amplify the illustration;

Fig. 2 is a fragmentary side elevational view of the tool as shown in Fig. 1 illustrating portions broken away and in section to amplify the illustration and;

Fig. 3 is a sectional view taken from the line 3—3 from Fig. 2.

The hitch frame 10 is adapted to be connected with conventional three point tractor hitches for use in elevating the tool from the ground for the purpose of transporting the same in a manner common to a conventional tractor. The hitch frame 10 is provided with axially horizontal trunnions 11 and 12 to which are connected the conventional tractor hitch arms 13 and 14, respectively. The upper portions 15 of the frame 10 support the bolt 16 on which the upper hitch 17 of the conventional three point tractor hitch is pivotally supported. The hitch frame 10 is generally A-shaped and is provided with a lower bar 18 and an upper bar 19 in space relationship therewith. Interconnecting the bars 18 and 19 is the bolt 20 which is surrounded by a bushing 21. Pivotally mounted on the bushing 21 are the bearings 22, 23 and 24, which support arms 25, 26 and 27, respectively. Fixed to the bearing 23 is a bracket 28 which is arranged in close proximity to the radius bar 29 which is carried by the bar 18 of the frame 10. The pin 30 shown in its carrier is adapted to be inserted into coinciding holes in the bracket 28 and the radius bar 29 for the purpose of locking the bearing 23 in certain fixed position relative to the bar 28 which is normally maintained in certain disposition by means of the hitch members 13 and 14 of the tractor, which is not shown. Fixed to the arm 25 is an upstanding bracket 31. Extending through this bracket 31 is a spring adjusting bolt 32 which is connected to the spring 33. The spring 33 is secured to the chain 34 having its opposite ends fixed to the hitch frame 10 at opposite sides thereof, as shown best in Fig. 1 of the drawings. The spring 33 is arranged to flex when the arm 25 pivots about the axis of the bolt 20 whereby tension in the spring 33 tends to maintain alignment of the tool behind the tractor when in elevated position. The bolts 35 extending through holes in the radius bar 29 also serve to limit pivotal movement of the arm 25 about the axis of the bolt 20 due to the engagement of the bracket 28 therewith, as indicated by dash lines in Fig. 1 of the drawings.

The arms 26 and 27 pivot about the axis of the bolt 20 by means of the bearings 23 and 24 which are secured in the swivel 36 and 37. The arms 26 and 27 are preferably tubular members being telescopically mounted in the swivels 36 and 37 and are fixed therein by pins 38 and 39, respectively, which extend therethrough. The swivels 36 and 37 are pivotally mounted on cross members 40 and 41 of the front frame 42 by bolts 43 and 44, respectively. Revolvably mounted on the front implement frame 42 is the disc gang 45. Laterally adjustably mounted on the rear bar 46 of the front implement frame 42 is the intermediate frame 47. The frame 47 may be adjusted on the frame 42 by moving it laterally of the implement or axially of the disc gang 45. The intermediate frame is fixed to the front implement 42 by means of bolts 48 which permit adjustment of the frame 47 relative thereto. The frame 47 is provided with a bar 49 which extends parallel to the axis of the disc gang 45 and extends over the arm 25 as shown best in Figs. 1 and 2 of the drawings. The rear implement frame 50 is similar to the front implement frame 42 and is preferably provided with a bracket 51 pivoted to the intermediate frame 47 by means of the bolt 52. The hydraulic cylinder 53 is pivoted to the intermediate frame 47 by means of the bolt 54 and the plunger of this hydraulic cylinder 53 is pivoted to the bracket 51 by means of the bolt 55. The bolt 55 is considerably spaced from the bolt 52 providing an arm by which the force of the hydraulic cylinder 53 may act to pivot the frame 50 about the axis of the bolt 52. Other means may be used to adjust the angular relation between the front and rear disc gangs, then in that event, the bolt 61 is inserted in hole 62' and the rear disc gang is held in rigid angular relation to the front disc gang. Revolvably mounted on the lower portion of the rear implement frame 50 is the disc gang 56. The tubular swivel 57 is pivotly mounted on the cross-member 58 of the rear implement frame 50 by means of the bolt 59. The arm 25 is preferably tubular in cross-section and extends through the swivel 57. Adjustably positioned on the arm 25 is a collar 60. Extending through the collar 60 and the arm 25 is a bolt 61. The bolt 61 may be used to locate the collar 60 longitudinally of the arm 25 with reference to the holes 62 therein whereby certain angular relationship of the frame 50 relative to the frame 42 may be maintained, as illustrated by dash lines, wherein the swivel 57 is shown engaged with the collar 60.

The operation of my agricultural tool for tractors having elevating hitches is substantially as follows:

When the trunnions 11 and 12 are connected with the conventional tractor hitch members 13 and 14 and when the bolt 16 in the hitch frame 10 is connected to the conventional hitch member 17 of a tractor, the frame 10 may be elevated or lowered in the conventional manner. When being drawn by the tractor, the entire tool may pivot about the axis of the bolt 20 while the disc gangs 45 and 56 remain in the ground. The bolts 35 in the radius bar 29 engage the bracket 28 preventing excessive pivoting of the tool with relation to the tractor so that the disc gang 45 does not engage the rear wheels of the tractor when turning. The arms 26 and 27 may be longitudinally adjusted in the swivels 36 and 37, respectively, in order to provide tool offset of the front implement frame 42. The arm 25 extends through the swivel 57 of the rear frame 50 which is pivotly mounted to the intermediate frame 47 as hereinbefore described. The adjustable relationship of the collar 60 longitudinally of the arm 25 limits the angular relationship of the rear implement frame 50 relative to the front implement frame 42 so that the cutting depth of the tool may be controlled. It will here be noted that the operation of the hydraulic cylinder 54 may be employed to adjust the relative angle of the frame 50 and operation of this hydraulic cylinder 53 may be remote so that the operator of the tractor easily controls it from his seated position on the tractor, or when a hydraulic cylinder is not used, then in that event the bolt 61 is inserted in hole 62' and through one of the holes 62 for the desired angular adjustment of the gangs.

It will be here noted that adjustment of the arm 27 in the swivel 37 permits the operator to set the distance of the tool from the tractor hitch whereby the tool may be mounted and operated as close as practical to the rear of the tractor. When the implement frames 42 and 50 are in parallel relation to each other, as shown in Fig. 1 of the drawings, the tractor may make a left or right turn with the tool in the ground or may draw the tool along a road or over the ground with a minimum of resistance and when loading the tool in this position, it may be readily drawn up a conventional loading ramp onto a trailer for truck transport thereof. When the rear implement frame 50 is in the dash line position, as shown in Fig. 1 of the drawings, the tractor may make a right hand turn with the implement in the ground, during which time the bar 49 holds the arm 25 downwardly controlling the penetration of the implements or disc gang which are revolvably mounted on the rear implement frame 50. When the tool is raised by operation of the tractor hitch members 13, 14 and 17, the spring 33 under tension holds the chain 4 tight and tends to maintain the angular disposition of the arm 25 relative to the frame 10, substantially as shown in Fig. 1 of the drawings. Thus, the tool is prevented from swinging when it is raised clear of the ground so that it does not endanger the operator of the tractor. When the tool has been raised and it is desired to transport the same, the spring 33 thus maintains the tool in stable position until the operator places the pin 30 in coinciding holes in the bracket 28 and the radius bar 29.

It will be obvious to those skilled in the art that the various novel features of this invention may be applied to implements which employ soil working devices other than disc gangs.

The implement shown is specifically a disc harrow, and possibly the invention is most useful when the implement is of the disc harrow type, because implements of this type are used extensively throughout the farming areas and is a universal type of tillage implement. But it is not the intention that the appended claims shall be limited to an implement of the disc harrow type nor even to farm implements unless such limitation is plainly expressed.

What I claim is:

1. In an agricultural tool for tractors having elevating hitches, the combination of a hitch frame having axially horizontal trunnions and adapted to be connected to the conventional hitch means of a tractor, an implement frame rearwardly of said hitch frame and pivotly connected thereto on a vertical axis, a second implement frame pivotly connected to said first implement frame rearwardly thereof and adapted to move into angular position relative thereto, a swivel on said second mentioned implement frame, an arm pivotly mounted on a vertical axis in connection with said hitch frame and extending through said swivel and means longitudinally adjustable on said arm and engageable with said swivel for limiting the pivotal movement of said second mentioned implement frame relative to said first mentioned implement frame.

2. In an agricultural tool for tractors, having elevating hitches, the combination of a hitch frame having axially horizontal trunnions and adapted to be connected to the conventional hitch means of a tractor, an implement frame rearwardly of said hitch frame and pivotly connected thereto on a vertical axis, a second implement frame pivotly connected to said first implement frame rearwardly thereof and adapted to move into angular position relative thereto, a swivel on said second mentioned implement frame, an arm pivotly mounted on a vertical axis in connection with said hitch frame and engageable with said swivel for limiting the pivotal movement of said second mentioned implement frame relative to said first mentioned frame, a hydraulic cylinder interconnecting said first mentioned implement and second mentioned implement frame for pivotally moving the same relative to the first mentioned implement frame.

3. In an agricultural tool, for tractors having elevating hitches, a hitch frame having axially horizontal means adapted to be pivotally connected with the conventional elevating hitch of a tractor, a pair of rearwardly diverging arms pivotally connected with said hitch frame on a common vertical axis, an implement frame rearwardly of said hitch frame having swivel members thereon and means for adjustably connecting said arms with said swivel members whereby the offset and rearward spacing of said implement frame may be adjusted relative to said hitch frame.

4. In an agricultural tool for tractors, having elevating hitches, a hitch frame having axially horizontal means adapted to be pivotally connected with the conventional elevating hitch of a tractor, a pair of rearwardly directed arms pivotally connected with said hitch frame on a common vertical axis, an implement frame rearwardly of said hitch frame having swivel members thereon and means for adjustably connecting said arms with said swivel members whereby the off-set and rearward spacing of said implement frame may be adjusted relative to said hitch frame, a second implement frame rearwardly of said first mentioned implement frame, means for adjustably off-setting said second mentioned implement frame including adjustable mechanism for also maintaining said second mentioned implement frame in angular relationship to said first mentioned implement frame.

5. In an agricultural tool for tractors, having elevating hitches, a hitch frame having axially horizontal means adapted to be pivotally connected with the conventional elevating hitch of a tractor, a pair of rearwardly directed arms pivotally connected with said hitch frame on a common vertical axis, an implement frame rearwardly of said hitch frame having swivel members thereon and means for adjustably connecting said arms with said swivel members whereby the off-set and rearward spacing of said implement frame may be adjusted relative to said hitch frame, a second implement frame rearwardly of said first mentioned implement frame, means for adjustably off-setting said second mentioned implement frame including adjustable mechanism for also maintaining said second mentioned implement frame in angular relationship to said first mentioned frame, a disc gang in connection with each of said implement frames whereby the axis of the disc gangs may be angular to each other and off-set by said means.

References Cited in the file of this patent
UNITED STATES PATENTS

| | | |
|---|---|---|
| Re. 22,627 | McKay | Apr. 3, 1947 |
| 2,337,801 | Cook | Dec. 28, 1943 |
| 2,568,082 | McKay | Sept. 18, 1951 |
| 2,583,897 | Smeds | Jan. 29, 1952 |
| 2,601,640 | Simmons | June 24, 1952 |
| 2,607,276 | Morton | Aug. 19, 1952 |
| 2,617,342 | Meissner | Nov. 11, 1952 |
| 2,618,213 | Welcher et al. | Nov. 18, 1952 |